No. 754,340. PATENTED MAR. 8, 1904.
F. PASSARELLI.
PROCESS OF PRESERVING FRUIT.
APPLICATION FILED OCT. 22, 1903.
NO MODEL.
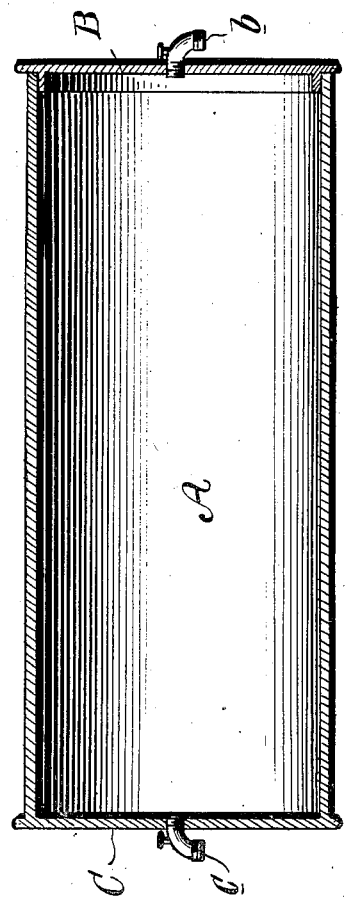
Witnesses
Jas A. Koehl.
Inventor
Ferdinando Passarelli.
By H. B. Willson,
Attorney No. 754,340. Patented March 8, 1904.

UNITED STATES PATENT OFFICE.

FERDINANDO PASSARELLI, OF NEW YORK, N. Y.

PROCESS OF PRESERVING FRUIT.

SPECIFICATION forming part of Letters Patent No. 754,340, dated March 8, 1904.

Application filed October 22, 1903. Serial No. 178,122. (No specimens.)

*To all whom it may concern:*

Be it known that I, FERDINANDO PASSARELLI, a citizen of the United States, residing at New York, in the county of New York and State of New York, have invented certain new and useful Improvements in Processes of Preserving Fruit; and I do declare the following to be a full, clear, and exact description of the invention, such as will enable others skilled in the art to which it appertains to make and use the same.

This invention relates to a process of preserving fruit whole or in an undivided state and without deterioration of its appearance and quality.

The object of the invention is to provide a simple and effective process of treatment whereby fruits may be packed for preservation or treatment and preserved for an indefinite period.

The figure of the drawing shows in vertical longitudinal section a form of container which may be employed in my process, said container comprising a vessel A, having a removable end or head B, provided with an admission-cock $b$, the opposite end or head C having an exhaust-cock $c$.

In carrying my invention into practice perfect fruit in a whole or undivided state is treated for a suitable period to a bath of lime-water and then laid out in a wet state in the shade on boards or matting until the water from the bath has dried off or evaporated, leaving the solid particles to close the pores of the fruit. Then the fruit is placed in the container A, the latter being filled as full as possible. The cover is then soldered on or otherwise applied to hermetically seal the container, after which both cocks $b$ and $c$ are opened and carbonic-acid gas admitted through cock $b$. This gas displaces the air through cock $c$, and when all the air has been displaced and the vacant spaces in the container are entirely filled with carbonic-acid gas both cocks $b$ and $c$ are closed. Fruit so packed and treated may be preserved for an indefinite period without deterioration of its appearance or quality. The vessel A will serve both as a storing or shipping and preserving vessel.

The purpose of treating the fruit to the lime-bath to close its pores is to protect it from any impurities in the carbonic-acid gas. The gas is used under normal pressure, which is sufficient to displace all air and eliminate all bacteria or microbic life, thus making this treatment much superior to the vacuum process.

Having thus fully described my invention, what I claim as new, and desire to secure by Letters Patent, is—

The process of preserving fruit, consisting in subjecting the fruit to a bath of lime-water, removing the fruit from the bath, drying the surface of the fruit by evaporation so as to displace the water, leaving the solid particles of the bath to close the pores of the fruit, packing the fruit within a container, simultaneously exhausting the air from the container and admitting carbonic-acid gas thereto, and hermetically sealing the container when the air has been exhausted and all vacant spaces in the container filled by the carbonic-acid gas, substantially as described.

In testimony whereof I have hereunto set my hand in presence of two subscribing witnesses.

FERDINANDO PASSARELLI.

Witnesses:
EDWARDO CUTOLO,
CLEMENTE COVINO.